Dec. 15, 1964  J. F. BRYAN, JR  3,161,213
VERTICALLY-RECIPROCATING SAW APPARATUS FOR CUTTING CROSSTIES
Filed Feb. 23, 1962  4 Sheets-Sheet 1
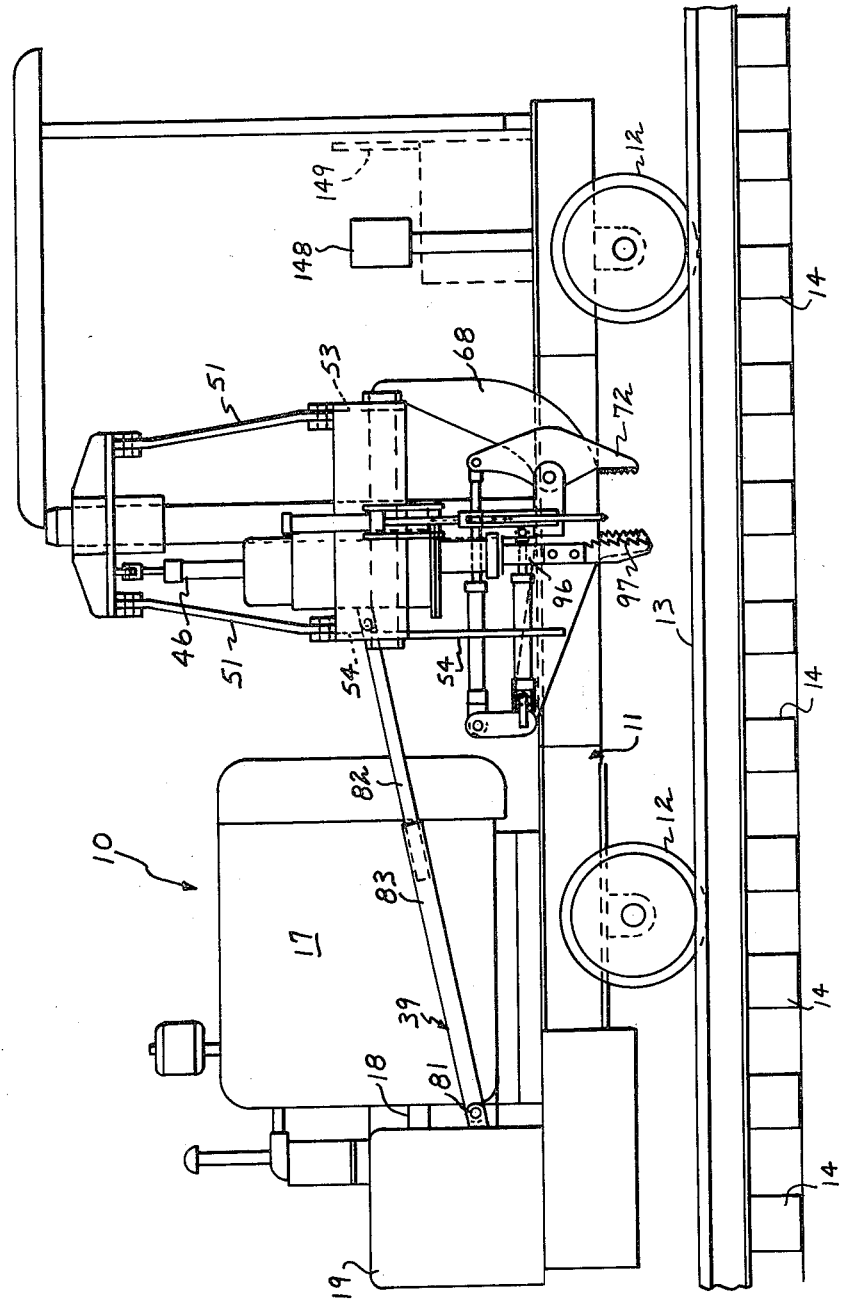
INVENTOR.
John F. Bryan Jr.
BY
Jennings, Carter + Thompson
Attorneys

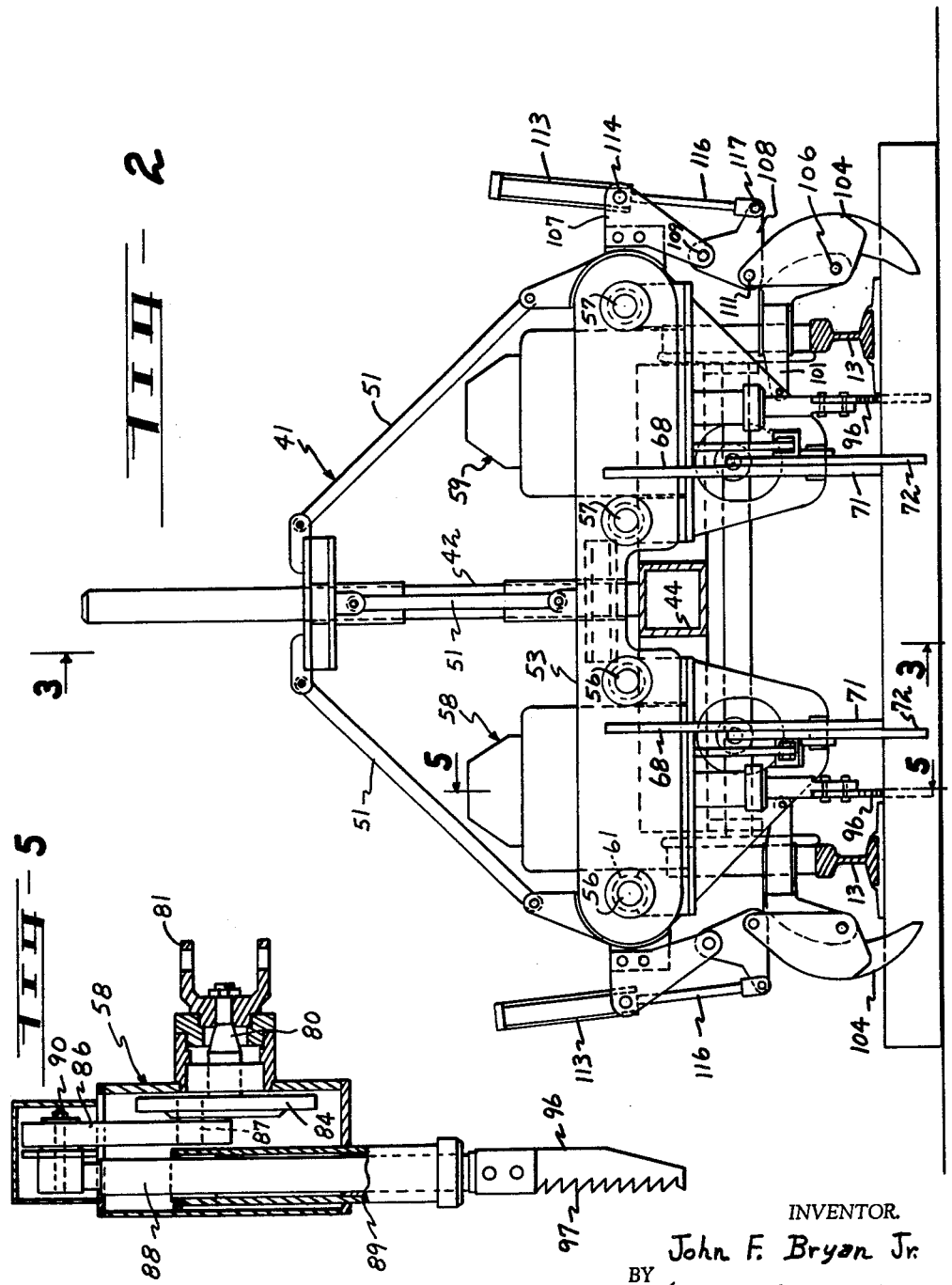

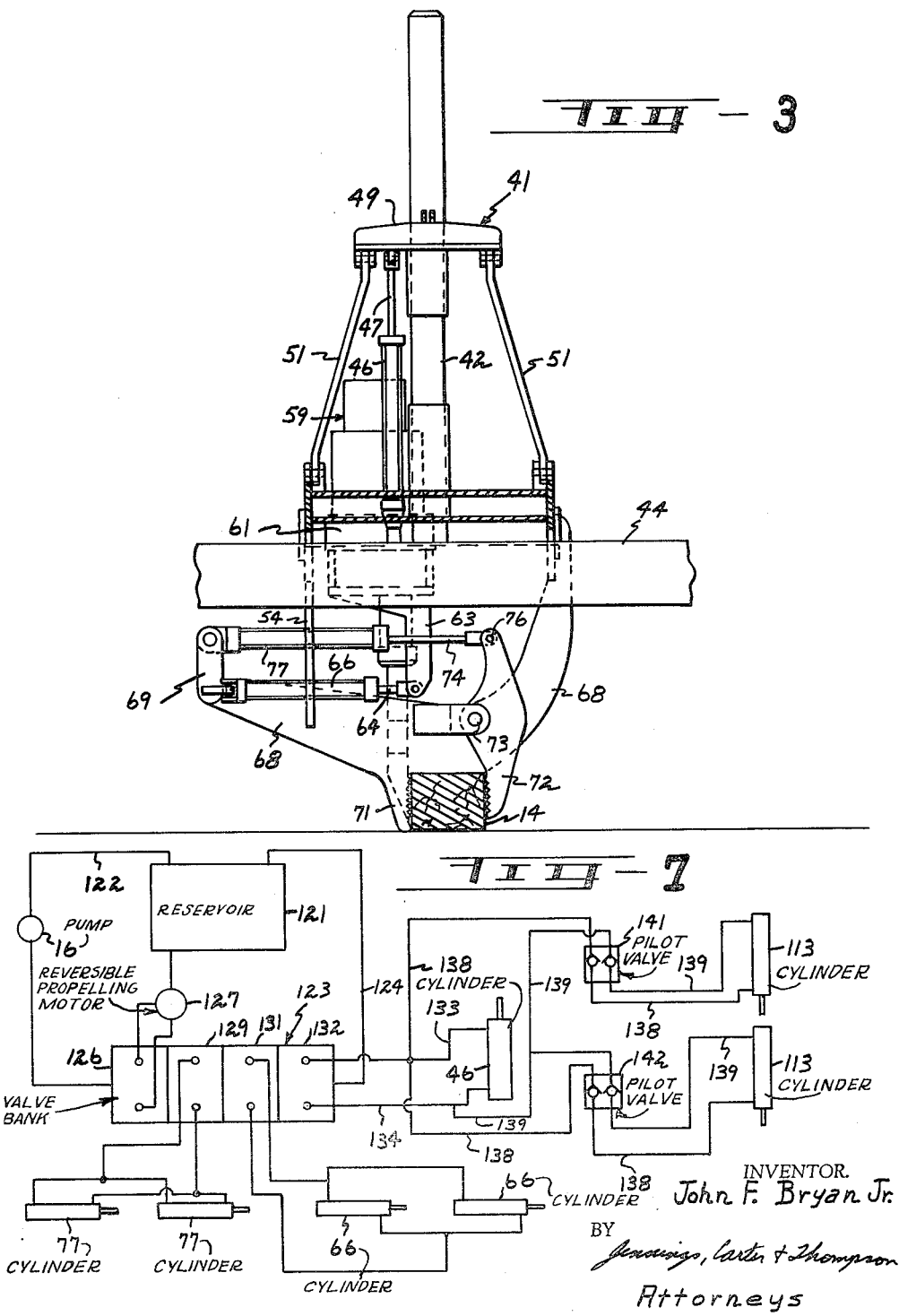

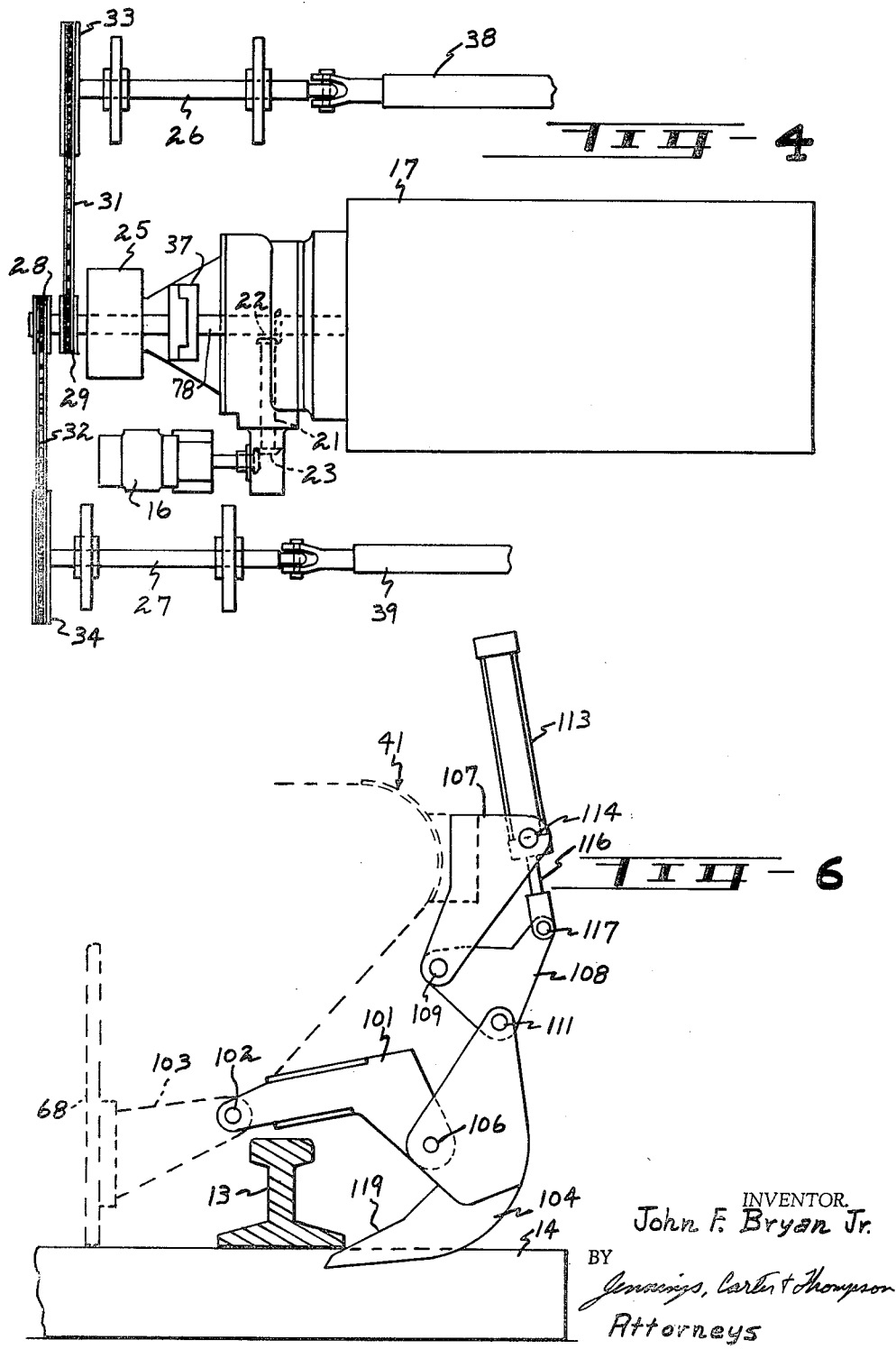

United States Patent Office 3,161,213
Patented Dec. 15, 1964

3,161,213
VERTICALLY-RECIPROCATING SAW APPARATUS FOR CUTTING CROSSTIES
John F. Bryan, Jr., Montgomery, Ala., assignor to Kershaw Manufacturing Company, Inc., a corporation of Alabama
Filed Feb. 23, 1962, Ser. No. 175,024
7 Claims. (Cl. 143—68)

This invention relates to apparatus for cutting crossties and more particularly to such apparatus for cutting crossties in place beneath the rails of a track.

Heretofore, it has been common to remove crossties from beneath the track either by pulling or driving the same laterally from beneath the rails. Removal of crossties in such manner requires considerable working space and the ballast of the roadbed is disturbed to a certain extent. In some instances, circular saws and shears have been employed to cut the crossties with the center section of the cut crosstie between the rails being lifted by a gripping means.

It is an object of the present invention to provide apparatus having, in combination, means to cut the crosstie in place immediately adjacent the inner side of each rail and means to hold the crosstie as it is being cut.

An additional object of my invention is to provide apparatus to saw a crosstie in place on the roadbed of a track comprising a saw frame adjacent the inner side of each rail mounted for longitudinal movement in the direction of the track, each of which has an elongated saw blade extending alongside the crosstie with teeth facing a side of the crosstie, and means to reciprocate the saw blades whereby the crosstie is cut in place in three sections.

A further object of my invention is to provide vehicle mounted apparatus to saw crossties in place comprising means to grip the crosstie and hold it while being sawed, together with means engageable under the rails of the track to pull the tie gripping means and saw into compacted ballast, thereby facilitating the proper placement of the grippers and saw.

Briefly described, my invention comprises a main frame having wheels adapted to ride along a track with a tool frame mounted on the main frame for vertical movement and a pair of grippers mounted on the tool frame between the rails and adapted to engage and grip opposite sides of a crosstie to hold the crosstie in place as it is being sawed. A saw frame is positioned on the tool frame adjacent each of the rails and an elongated saw blade is mounted on each saw frame having teeth facing a side of the crosstie with means to reciprocate the saw blades in a vertical direction to cut the crosstie, and means to move the saw frames relative to the tool frame in a direction parallel to the rails.

Apparatus embodying features of my invention is shown in the accompanying drawings, forming a part of this application, in which:

FIG. 1 is a side elevational view of my improved apparatus for the in situ cutting of crossties;

FIG. 2 is a front end elevational view of the cutting apparatus shown in FIG. 1;

FIG. 3 is a sectional view taken generally along the line 3—3 of FIG. 2 and showing a tool frame on which the cutting members are mounted;

FIG. 4 is a schematic or diagrammatic view of the drive mechanism for my improved apparatus shown in FIG. 1;

FIG. 5 (Sheet 2) is a sectional view taken through the saw frame generally along the line 5—5 of FIG. 2 and showing the drive for the reciprocating saws;

FIG. 6 (Sheet 4) is an enlarged fragmentary side elevational view of the means for gripping the rails with the gripping means shown in gripping relation; and, FIG. 7 (Sheet 3) is a diagrammatic view of the fluid system for my cutting apparatus.

Referring now to the drawings for a better understanding of my invention, I show in FIG. 1 a railway vehicle indicated generally by the numeral 10 and comprising a main frame 11 having wheels 12 adapted to ride along rails 13 supported by crossties 14. A diesel engine 17 is mounted on main frame 11 and has a drive shaft 18 extending therefrom.

A housing 19 covers the drive mechanism which is shown diagrammatically in FIG. 4. Referring to FIG. 4, fluid pump 16 is driven from shaft 18 through countershaft 21 and meshing pairs of bevel gears 22 and 23. Shafts 26 and 27 are driven through gear reducer 25 and sprockets 28 and 29, respectively, on shaft 18. Sprocket chains 31 and 32 extend around sprockets 33 and 34 on shafts 26 and 27, respectively. A clutch 37 on shaft 18 allows shafts 26 and 27 to be disconnected if desired while fluid pump 19 is driven through shaft 21. Shafts 26 and 27 are connected through suitable universal connections to shafts 38 and 39, respectively, for driving the tie saws as will be explained below.

Referring now specifically to FIGS. 1–3, a tool frame is indicated generally by the numeral 41 and is mounted on a vertical column 42 for relative vertical movement. Column 42 is secured to an intermediate center beam 44 of main frame 11. Cylinder 46 is mounted on beam 44 and piston rod 47 extending therefrom is connected to tool frame 41. Thus, upon actuation of cylinder 46 tool frame 41 moves upwardly and downwardly relative to column 42.

Tool frame 41 comprises an upper collar 49 having pivotally mounted braces 51 connected thereto and extending to other portions above tool frame 41 for support thereof. End plates 53 and 54 are connected to each other by tubular members 56 and 57 extending therebetween. A saw frame indicated generally by the numeral 58 is mounted on tubular members 56 and a second saw frame 59 is mounted on tubular members 57. Saw frames 58 and 59 have sleeves 61 that fit over tubular members 56 and 57 for sliding movement. Each saw frame 58 and 59 has a downward extension 63 (see FIG. 3) that is connected to a piston rod 64 of cylinder 66.

A lower support plate 68 is secured to the outer surface of end plate 53 on each side thereof and is also secured to the lower portion of end plate 54. Cylinders 66 are connected at one end to brackets 69 on supports 68. Upon actuation of cylinders 66, saw frames 58 and 59 move along tubular members 56 and 57 relative to tool frame 41.

To grip and hold the crosstie as it is being sawed and to aid in positioning railway vehicle 10 properly, a relatively fixed tie gripper 71 is positioned on each lower support 68 adjacent one side of crosstie 14 to be cut. An oppositely directed tie gripper 72 is pivotally mounted at 73 on lower support 68 to engage and grip the side of the crosstie opposite the side that tie grippers 71 engage. Piston rod 74 is pivotally mounted to each gripper 72 at 76 and a cylinder 77 is fixed to each extension 69. Thus, upon actuation of cylinders 77 tie grippers 72 are pivoted into and out of engagement with crosstie 14.

Referring now to FIG. 5 in which saw frame 58 is shown, shaft 39 has a universal connection 81 at each end so that shaft 39 (FIG. 1) may pivot as tool frame 41 moves upwardly and downwardly relative to main frame 11. Shaft 39 comprises telescoping square tubular portions 82 and 83 to compensate for the movement of tool frame 41. A disc or flywheel 84 (FIG. 5) is driven through a stub shaft 89 from universal connection 81 and a connecting rod or arm 86 is mounted eccentrically on flywheel 84 at its lower end through pin 87. The upper end of arm 86 is connected by pin 90 to the upper end of tubular member 88 mounted for reciprocation within casing 89. Saw blade 96 is mounted on the lower end of tubular member 88 and upon rotation of shaft 39 saw blade 96 reciprocates in a vertical direction through arm 86. Saw blade 96 has teeth 97 thereon and upon reciprocation of saw blade 96 teeth 97 engage a side of the crosstie in cutting action on both the up and down stroke of blade 96 to saw the crosstie. Saw frame 59 is identical to saw frame 58 and thus, a saw blade 96 is positioned adjacent each rail between rails 13 and tie grippers 71 and 72 thereby to saw the crosstie into three sections.

Referring to FIG. 6, gripping means are shown for pulling tool frame 41 along with tie grippers 71 and saw blades 96 downwardly in the ballast after frame 41 has been initially lowered. The gripping means is positioned on each end of tool frame 41 and each gripping means comprises an arm 101 pivotally connected at 102 to a bracket 103 secured to support plate 68. Gripping tool 104 is pivotally mounted at 106 to arm 101. A bracket 107 is fixed to the outer ends of tool frame 41. A generally triangular link 108 is pivotally connected at 109 to bracket 107 and at 111 to gripping tool 104. Cylinder 113 is pivotally mounted at 114 to fixed bracket 107 and piston rod 116 extending therefrom is pivotally connected at 117 to an apex of triangular link 108. Upon actuation of cylinder 113 from the position shown in FIG. 2, piston rod 116 is drawn upwardly to pivot link 108 and tool 104. Tools 104 initially engage rails 13 as shown in FIG. 6 and upon further actuation of cylinders 113 tool frame 41 is pulled downwardly and rail grippers 104 move further inwardly beneath rails 13 as frame 41 moves downwardly. Grippers 104 are provided with slanted rail contacting surfaces 119.

Referring now to FIG. 7 in which the fluid system for my apparatus is shown diagrammatically, a fluid reservoir is indicated by the numeral 121 and pump 16 receives fluid from supply line 122. Fluid is supplied by pump 16 to valve bank 123 and return line 124 returns the fluid to reservoir 121. Valve 126 of valve bank 123 controls the flow of fluid to reversible propelling motor 127 which is connected in driving relation to the axle of front wheels 12. Valve 129 of valve bank 123 controls the flow of fluid to cylinders 77 which actuate pivotally mounted tie grippers 72. Valve 131 controls the flow of fluid to cylinders 66 which move saw frames 58 and 59 along tubular members 56 and 57 as the crosstie is being cut.

Valve 132 controls the flow of fluid to cylinder 46 for raising and lowering tool frame 41 and to cylinders 113 for actuating rail grippers 104. Lines 133 and 134 supply fluid to cylinder 46. Line 138 supplies fluid to cylinders 113 for raising piston rods 116 and thereby causing rail grippers 104 to grip tightly the rails. Line 139 supplies fluid to cylinders 113 to lower piston rods 116 of cylinders 113 and thereby cause rail grippers 104 to be removed from contact with rails 13. Double pilot operated check valves 141 and 142 are provided in lines 138 and 139 to cylinders 113 and are actuated when control valve 132 is actuated and a predetermined fluid pressure is reached. Valves 141 and 142 permit the flow of fluid to cylinders 113 through lines 138 and 139 at a predetermined pressure but allow the free flow of fluid from cylinders 113 through lines 138 and 139.

When fluid is supplied to cylinder 46 through line 133 to lower tool frame 41, valves 141 and 142 do not permit fluid to cylinders 113 until a predetermined pressure is reached in line 138 when tool frame 41 engages the roadbed. Then, valves 141 and 142 are actuated to permit the flow of fluid to cylinders 113 whereby rail grippers 104 engage rails 13 to pull tool frame 41 downwardly if the tools on frame 41 have not fully penetrated the ballast thereby to press the tools downwardly into the ballast. Tool frame 41 may be moved downwardly as much as 5 inches after rail grippers 104 are actuated.

When it is desired to move to the next crosstie, valve 132 is actuated to move valves 141 and 142 and fluid is supplied to cylinders 113 through line 139 thereby to raise grippers 104. Since tool frame 41 is relatively heavy cylinders 113 are actuated before cylinder 46 which requires a greater fluid pressure. When grippers 104 reach the end of their upward stroke an increase in fluid pressure actuates cylinder 46 to raise frame 41.

A control panel 148 is provided on main frame 11 as shown in FIG. 1 and a seat 149 is mounted adjacent thereto for an operator of vehicle 10.

In operation, tool frame 41 is positioned over the crosstie to be cut with tie grippers 72 pivoted upwardly to clear the crosstie as tool frame 41 is lowered. Ordinarily, the spikes will be pulled from the ties to be cut. Valve 132 is actuated and frame 41 will fall by gravity until it rests on the ballast with the grippers 71 moving downwardly in the ballast adjacent a crosstie. If frame 41 penetrates the ballast fully rail grippers 104 will be actuated to grip rails 13 without pulling frame 41 downwardly but if full penetration of the ballast is not obtained by frame 41 rail grippers 104 will pull frame 41 downwardly upon fluid reaching cylinders 113 through line 138. By actuating valve 132 fluid pressure may then be released in line 133 and through valve 126 propelling motor 127 is energized to move the entire vehicle slightly along the rails, thereby to press tie grippers 71 tightly against one side of the crosstie. Then cylinders 77 are actuated to pivot the grippers 72 into engagement with the opposite side of the tie. Then actuation of valve 132 to put pressure in lines 138 through valves 141 and 142 will cause rail grippers 104 to grip the rails 13 and pull tool frame 41 downwardly tightly on rails 13. In this position, the crosstie is now ready to be sawed. Through a suitable clutch arrangement, shafts 38 and 39 are rotated to reciprocate saw blades 96 and fluid pressure is continuously applied to cylinders 66 to move saw frames 58 and 59 along tubular members 56 and 57 as the crosstie is being cut. The crosstie is cut into three sections and may be easily removed by suitable tie pushing apparatus attached to the present apparatus or operated separately. It is desirable to lift the center section of the sawed tie with tool frame 41 and then to push out the end sections.

From the foregoing, it will be understood that I have provided apparatus to cut a crosstie in place adjacent each rail and to hold the crosstie as it is being cut. The saw frames on which the saws are mounted are adapted for generally horizontal movement in the direction of the track relative to the vertically movable tool frame on which the saw frames are mounted. Further, means are provided to engage the rails to pull the tool frame downwardly toward the ballast together with means to engage and hold the crosstie in place as it is being sawed.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In apparatus to saw a crosstie in place on the roadbed of the track beneath the rails,
   (a) a main frame having wheels to ride along the track,
   (b) a tool frame mounted on the main frame,
   (c) fluid pressure means to move the tool frame in a generally vertical direction relative to the main frame,
   (d) means to hold the crosstie,
   (e) a pair of pivotally mounted rail engaging means on the tool frame adapted to engage beneath the rails and force the crosstie holding means into the roadbed alongside the crosstie, (f) fluid pressure means to actuate said rail engaging means,
(g) fluid lines connecting the fluid pressure means of said tool frame and the fluid pressure means of the rail engaging means,
(h) valve means interposed in said fluid lines and permitting the flow of fluid to said fluid pressure means of the rail engaging means for moving them into engagement with the underside of the rails only when a predetermined fluid pressure is reached in the fluid lines during lowering of the tool frame,
(i) a saw frame supported on the tool frame,
(j) a saw blade on the saw frame,
(k) and means to reciprocate the saw blade.

2. In apparatus to saw a crosstie in place on the roadbed of the track beneath the rails,
(a) a main frame having wheels to ride along the track,
(b) a tool frame mounted on the main frame,
(c) fluid pressure means to move the tool frame in a generally vertical direction relative to the main frame,
(d) means to hold the crosstie,
(e) a pair of pivotally mounted rail grippers on the tool frame and adapted to engage the undersurface of both rails,
(f) fluid pressure means to actuate said rail grippers,
(g) fluid lines connecting in fluid communication the fluid pressure means of said rail grippers with the fluid pressure means of said tool frame,
(h) valve means interposed in said fluid lines and permitting the flow of fluid to said fluid pressure means of the rail grippers for moving the rail grippers to gripping position beneath the rails when a predetermined fluid pressure is reached in the fluid lines, said rail grippers being mounted on said tool frame so that said tool frame is moved downwardly as said rail grippers are urged into tight engagement with the undersurface of the rails,
(i) a saw frame on the tool frame,
(j) a saw blade on the saw frame,
(k) and means to reciprocate the saw blade.

3. In apparatus to saw a crosstie in place beneath the rails of a track,
(a) a main frame having wheels to ride along the track,
(b) a tool frame mounted on the main frame,
(c) means to move the tool frame in a generally vertical direction relative to the main frame,
(d) means to hold the crosstie,
(e) a pair of pivotally mounted rail grippers on the tool frame and adapted to engage the undersurface of the rails,
(f) fluid pressure means on the tool frame to pivot said rail grippers into and out of engaging relation with the underside of the rails, said fluid pressure means having relatively movable parts,
(g) a generally triangular link pivotally connected at one apex to one of the relatively movable parts and pivotally connected at a second apex to the adjacent rail gripper, said link being pivotally supported generally at the third apex thereof on an axis fixedly secured to the tool frame whereby upon actuation of said fluid pressure means the rail gripper is moved into and out of engagement with the rail through said link,
(h) and means mounted on the tool frame for sawing crossties.

4. In apparatus for in situ sawing of railroad crossties which are at least partially embedded in ballast,
(a) a main frame supported by rail engaging wheels,
(b) a saw frame mounted upon the main frame for vertical movement toward and from the roadbed,
(c) a vertically reciprocable saw carried by the saw frame and adapted to engage a side of the crosstie to be sawed,
(d) a pair of tie grippers carried by the saw frame adapted to be pushed substantially vertically downwardly into the ballast adjacent the tie to be cut and to engage opposite sides of the tie adjacent where the sawing takes place, and
(e) means on the saw frame operable to engage the rails and forceably move the tie grippers and saw substantially vertically into the ballast adjacent the tie to be sawed.

5. Apparatus as defined in claim 4 in which one tie gripper of said pair is a stationary member and the other is pivotally mounted for movement toward and from said stationary member.

6. Apparatus as defined in claim 4 in which the rail engaging means carried by the saw frame are constructed and arranged to engage the undersides of the rails.

7. In apparatus for in situ sawing of railroad crossties which are at least partially embedded in ballast,
(a) a rail supported wheeled main frame,
(b) a tool frame carried by the main frame and mounted thereon for vertical movement toward and from the roadbed,
(c) a vertically reciprocable power driven saw carried by a tool frame and disposed to engage a side of a crosstie to be cut,
(d) means to move the saw across the crosstie as the cutting proceeds,
(e) fluid pressure means for raising and lowering the tool frame vertically and disposed to lower a portion of the tool frame onto the ballast,
(f) a pair of cooperating crosstie grippers on the tool frame embodying fixed and movable jaw members adapted to penetrate the ballast and engage the opposite sides of the crosstie to be cut,
(g) a rail engaging member carried by the tool frame and disposed to contact the bottom of the rail when actuated thereby to pull the tool frame downwardly thus to force the tie grippers and saw into the ballast adjacent the crosstie to be cut,
(h) fluid pressure means for actuating the rail gripping member, and
(i) means operable to actuate the rail gripping members in response to the existence of a predetermined fluid pressure applied to the fluid pressure means for lowering the tool frame, whereby in case the crosstie grippers and saw are not forced into the ballast about the crosstie to be cut upon lowering of said tool frame, said rail gripping member is actuated, thereby to move them downwardly into operating position relative to the crosstie.

References Cited by the Examiner

UNITED STATES PATENTS

| | | | |
|---|---|---|---|
| 1,029,133 | 6/12 | Kohr. | |
| 1,725,495 | 8/29 | Bogler. | |
| 2,114,053 | 4/38 | Kniffen | 143—60 |
| 2,207,883 | 7/40 | Woolery. | |
| 2,603,255 | 7/52 | Woolery | 144—133.5 XR |
| 2,818,820 | 1/58 | Williams | 104—9 XR |
| 2,908,228 | 10/59 | Kershaw | 104—9 XR |
| 2,975,726 | 3/61 | Paulson | 104—9 XR |
| 2,996,016 | 8/61 | Keller | 104—9 XR |

LESTER M. SWINGLE, *Primary Examiner.*

EARL EMSHWILLER, WALTER A. SCHEEL, WILLIAM W. DYER, JR., *Examiners.*